(12) United States Patent
Watanabe et al.

(10) Patent No.: US 8,405,761 B2
(45) Date of Patent: Mar. 26, 2013

(54) IMAGE SENSING APPARATUS HAVING PUPIL-DIVIDED PIXELS AND PLURAL READOUT MODES

(75) Inventors: Yoshinori Watanabe, Tokyo (JP); Yoshinobu Sato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/680,529

(22) PCT Filed: Oct. 1, 2008

(86) PCT No.: PCT/JP2008/068251
§ 371 (c)(1), (2), (4) Date: Mar. 26, 2010

(87) PCT Pub. No.: WO2009/054263
PCT Pub. Date: Apr. 30, 2009

(65) Prior Publication Data
US 2010/0214431 A1    Aug. 26, 2010

(30) Foreign Application Priority Data
Oct. 24, 2007   (JP) ................. 2007-276757

(51) Int. Cl.
H04N 5/232  (2006.01)
(52) U.S. Cl. ............ 348/349; 348/222.1; 348/333.11; 348/345

(58) Field of Classification Search ........... 348/222.1, 348/345, 349; 396/121
See application file for complete search history.

(56) References Cited

U.S. PATENT DOCUMENTS

| 6,829,008 B1 | 12/2004 | Saga et al. |
| 2003/0011693 A1 | 1/2003 | Oda |
| 2003/0117508 A1 | 6/2003 | Tamamura |
| 2005/0068455 A1 | 3/2005 | Hatano |
| 2007/0237511 A1 | 10/2007 | Kusaka |
| 2009/0140122 A1* | 6/2009 | Suzuki ............... 250/201.2 |

FOREIGN PATENT DOCUMENTS

| JP | 2000-156823 A | 6/2000 |
| JP | 2003-198925 A | 7/2003 |
| JP | 2004-222062 A | 8/2004 |
| JP | 2006-154065 A | 6/2006 |
| JP | 2007-103590 A | 4/2007 |

* cited by examiner

*Primary Examiner* — Sinh Tran
*Assistant Examiner* — Paul Berardesca
(74) *Attorney, Agent, or Firm* — Carter, DeLuca, Farrell & Schmidt, LLP

(57) ABSTRACT

An image sensing apparatus includes an image sensor on which image sensing pixels (R, G, B) and focus detecting pixels (S1, S2) are arrayed. The image sensor has first lines in each of which N (N is an integer equal to or more than 2) focus detecting pixels (S1, S2) are arranged, and second lines in each of which M (M is a natural number less than N) focus detecting pixels (S1, S2) are arranged. The first lines and the second lines are arranged periodically.

4 Claims, 7 Drawing Sheets

IMAGE SENSING APPARATUS HAVING PUPIL-DIVIDED PIXELS AND PLURAL READOUT MODES

TECHNICAL FIELD

The present invention relates to an image sensing apparatus such as a digital still camera.

BACKGROUND ART

In recent years, a digital still camera using a high-pixel-density image sensor has been commercialized. In general, the digital still camera using a high-pixel-density image sensor adopts a driving method as the operation mode of the image sensor during EVF display or moving image sensing. In this driving method, signal lines other than those necessary for display on a liquid-crystal display device are thinned out to increase the finder rate.

A high-resolution digital still camera has been strongly required to sense a still image as instantaneously as a silver halide camera. To meet this demand, the time from when the release switch is pressed until image sensing must be short sufficiently. Especially, because AF requires only a short time until focusing, a variety of inventions associated with the phase difference AF scheme have been proposed.

Japanese Patent Laid-Open No. 2000-156823 discloses a technique associated with an AF scheme. This technique arranges photoelectric conversion elements for phase difference AF on the image sensor and uses a signal output from the image sensor in order to perform phase difference AF without any mechanical phase difference detection structure.

Japanese Patent Laid-Open No. 2003-198925 discloses a technique of switching lines to be read out between the AF time and the image generation time when the lines of the image sensor are thinned out and read out in EVF display or moving image sensing in an image sensing apparatus in which the image sensor includes photoelectric conversion elements for phase difference AF.

However, as for an image sensor having lines including photoelectric conversion elements for phase difference AF and lines including no photoelectric conversion elements, the techniques disclosed in Japanese Patent Laid-Open Nos. 2000-156823 and 2003-198925 read out lines including no photoelectric conversion elements for phase difference AF in EVF display or moving image sensing. These techniques read out lines including photoelectric conversion elements for phase difference AF in AF. This approach cannot cope with an image sensor in which photoelectric conversion elements for phase difference AF are arranged in all lines.

In addition, the techniques disclosed in Japanese Patent Laid-Open No. 2000-156823 and 2003-198925 read out lines including photoelectric conversion elements for phase difference AF from the image sensor again in AF, and use only the AF data. For this reason, as described in Japanese Patent Laid-Open No. 2003-198925, an image one frame before is displayed or recorded again in EVF display or moving image sensing in AF, resulting in the generation of an uncomfortable moving image such as that which freezes halfway.

DISCLOSURE OF INVENTION

It is an object of the present invention to provide an image sensing apparatus including an image sensor having a pixel arrangement which can effectively change the AF accuracy.

According to the first aspect of the present invention, there is provided an image sensing apparatus comprising an image sensor on which image sensing pixels and focus detecting pixels are arrayed, wherein the image sensor has first lines in each of which N (N is an integer equal to or more than 2) focus detecting pixels are arranged, and second lines in each of which M (M is a natural number less than N) focus detecting pixels are arranged, and the first lines and the second lines are arranged periodically.

According to the second aspect of the present invention, there is provided an image sensing apparatus comprising an image sensor on which image sensing pixels and focus detecting pixels are arrayed, wherein the image sensor has first lines in each of which N (N is an integer equal to or more than 2) focus detecting pixels are arranged, second lines in each of which M (M is a natural number less than N) focus detecting pixels are arranged, and third lines in each of which no focus detecting pixels are arrayed, and the first lines, the second lines, and the third lines are arranged periodically.

Further features of the present invention will become apparent from the following description of exemplary embodiments with reference to the attached drawings.

BEST MODE FOR CARRYING OUT THE INVENTION (First Embodiment)

Figure 1:
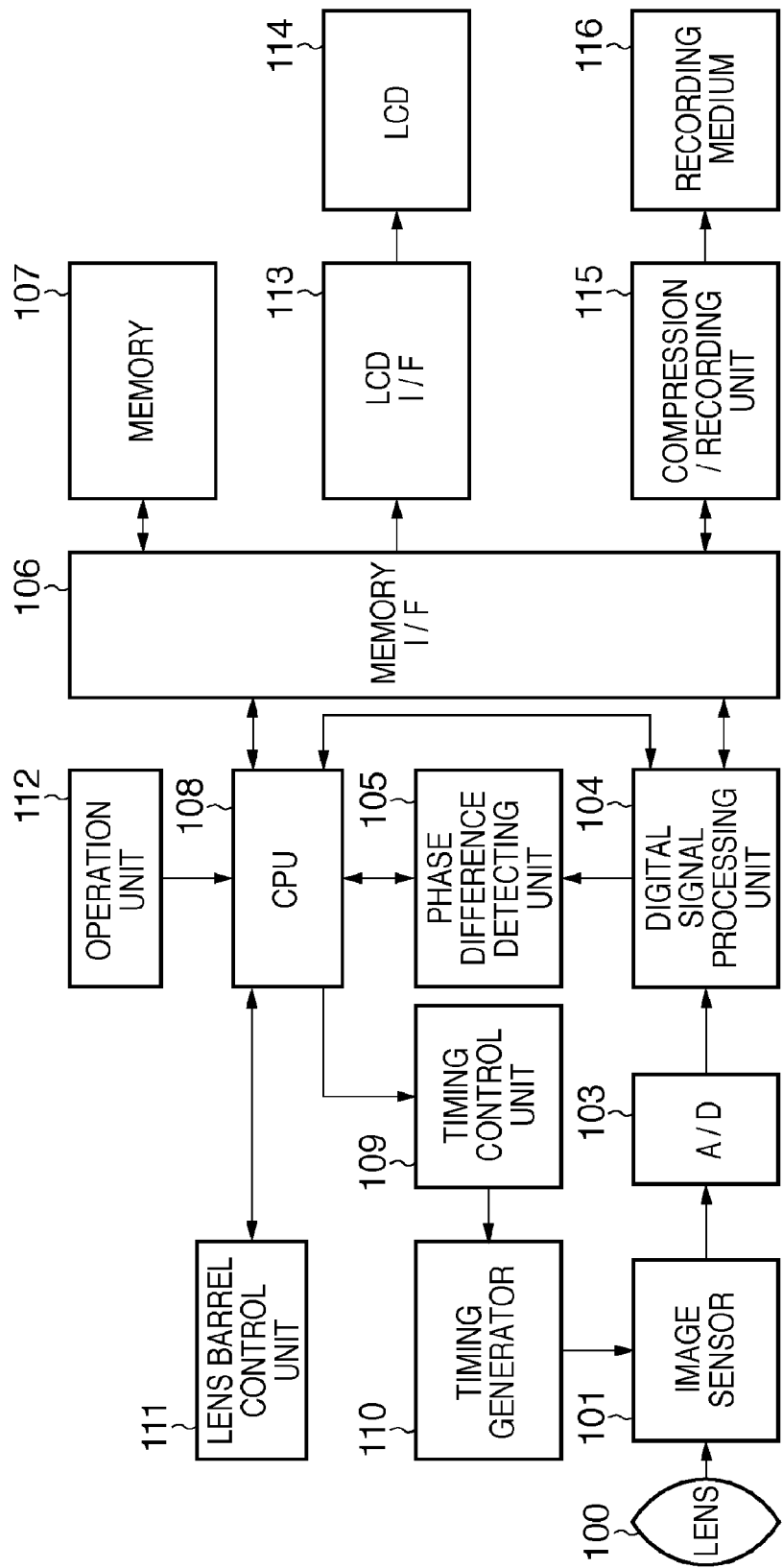
FIG. 1 is a block diagram showing the configuration of an image sensing apparatus according to the first preferred embodiment of the present invention.

FIG. 1 is a block diagram showing an image sensing apparatus according to the first preferred embodiment of the present invention. An object image which has entered the image sensing apparatus via a lens 100 is photoelectrically converted into an electrical signal by an image sensor 101. Note that image sensing pixels R, G, and B for image data formation and focus detecting pixels S1 and S2 for phase difference AF are arrayed on the image sensor 101, as shown in FIG. 2.

Figure 2:
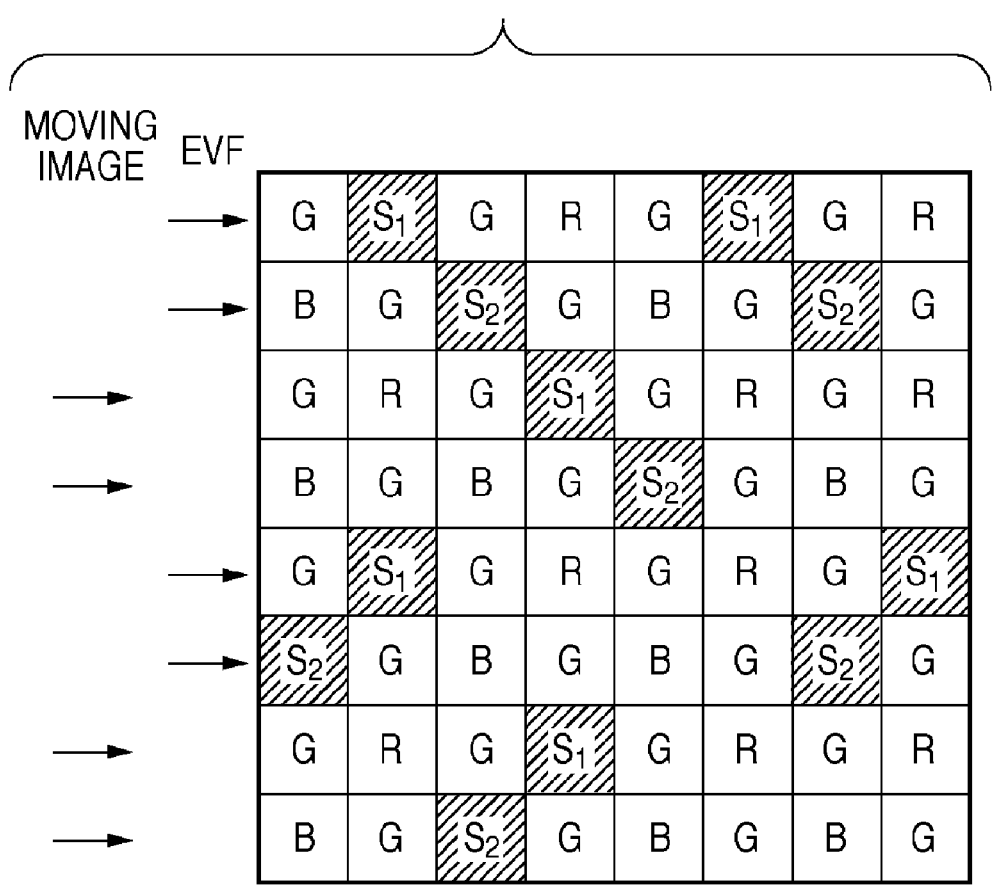
FIG. 2 is a schematic view showing an image sensor according to the first preferred embodiment of the present invention.

This embodiment will exemplify an image sensor in which the focus detecting pixels S1 and S2 are paired and arranged and a different number of focus detecting pixels are arranged for each line, as shown in FIG. 2. In this embodiment, first lines in each of which N (N is an integer equal to or more than 2) focus detecting pixels are arranged, and second lines in each of which M (M is a natural number less than N) focus detecting pixels are arranged are arranged periodically. For example, referring to FIG. 2, lines (corresponding to the arrows of "EVF") in each of which two focus detecting pixels are arranged, and lines (corresponding to the arrows of "Moving Image") in each of which one focus detecting pixel is arranged are arranged periodically.

An A/D conversion unit 103 converts the electrical signal output from the image sensor 101 into a digital signal. A digital signal processing unit 104 converts the digital signal output from the A/D conversion unit 103 into image data in the YUV data format. The A/D conversion unit 103 can comprise, e.g., a WB circuit, $\gamma$ correction circuit, and matrix transformation circuit.

Also, the digital signal processing unit 104 extracts AF data from the digital signal output from the A/D conversion unit 103, in accordance with the readout mode of the image sensor 101.

A CPU 108 determines the positions of the focus detecting pixels S1 and S2 on the basis of the position pattern information of distance measurement cells that is recorded in a built-in ROM, and interpolates pixel signals corresponding to these positions with their surrounding pixels. For example, the pixels S1 shown in FIG. 2 need only be interpolated using pixel signals from their surrounding R pixels by, e.g., the known bicubic method. After that, the resultant image data is converted into image data in the YUV data format. Furthermore, processes such as $\gamma$ correction are performed for the image data in the YUV data format.

A phase difference detecting unit 105 performs phase difference detection on the basis of the AF data output from the digital signal processing unit 104. The phase difference detection by the image sensor is described in detail in Japanese Patent Laid-Open No. 2000-156823, and a detailed description thereof will not be given herein. Put simply, in the conceptual view of the image sensor shown in FIG. 2, an approximate image which assumes that the rows of the pixels S1 and S2 are nearly identical to each other is formed on a microlens. If the camera lens which focuses onto an image on the image sensor is in focus on the image sensor, an image signal from an S1 group in each row including the pixels S1 matches that from an S2 group in each row including the pixels S2. If the focal point lies at the front or rear side of the image plane of the image sensor, an image signal from an S1 group in each row including the pixels S1 is out of phase from that from an S2 group in each row including the pixels S2. The phase shift direction reverses depending on whether the imaging point lies at the front or rear side of the image plane. In principle, this scheme is the same as the pupil division phase difference AF in this point. On the basis of this principle, an image formed in accordance with the array of the pixels S1 (a signal line which depends on the light intensity), and that formed in accordance with the array of the pixels S2 match each other if the camera lens is in focus, and they shift from each other if the camera lens is out of focus.

The phase difference detection result obtained by the phase difference detecting unit 105 is sent to the CPU 108. The CPU 108 outputs a control signal to a lens barrel control unit 111 on the basis of the detection result sent from the phase difference detecting unit 105.

An operation unit 112 includes, e.g., a button for switching the image sensing mode between still image sensing and moving image sensing, and setting switches such as a shutter switch. The CPU 108 sends a control signal to a timing control unit 109 in accordance with the image sensing mode set by the operation unit 112.

A timing generator 110 serves as a driving signal generation means for generating an image data readout driving signal on the basis of the control signal from the timing control unit 109. A method of reading out data from the image sensor 101 changes upon switching the readout driving signal in accordance with the image sensing mode.

A method of switching the readout mode of the image sensor 101 in accordance with the image sensing mode will be described later.

The image data in the YUV data format output from the digital signal processing unit 104 is temporarily saved in a memory 107 via a memory I/F 106 as image data for EVF display. An LCD I/F 113 converts the image data in the YUV data format saved in the memory 107 into that in the display format of a readout LCD 114 via the memory I/F 106. The readout LCD 114 performs EVF display on the basis of the image data output from the LCD I/F 113.

In image recording, the image data in the YUV data format output from the digital signal processing unit 104 is compressed in accordance with a standard such as JPEG, and recorded on a recording medium 116 by a compression/recording unit 115 via the memory I/F 106.

Figure 4:
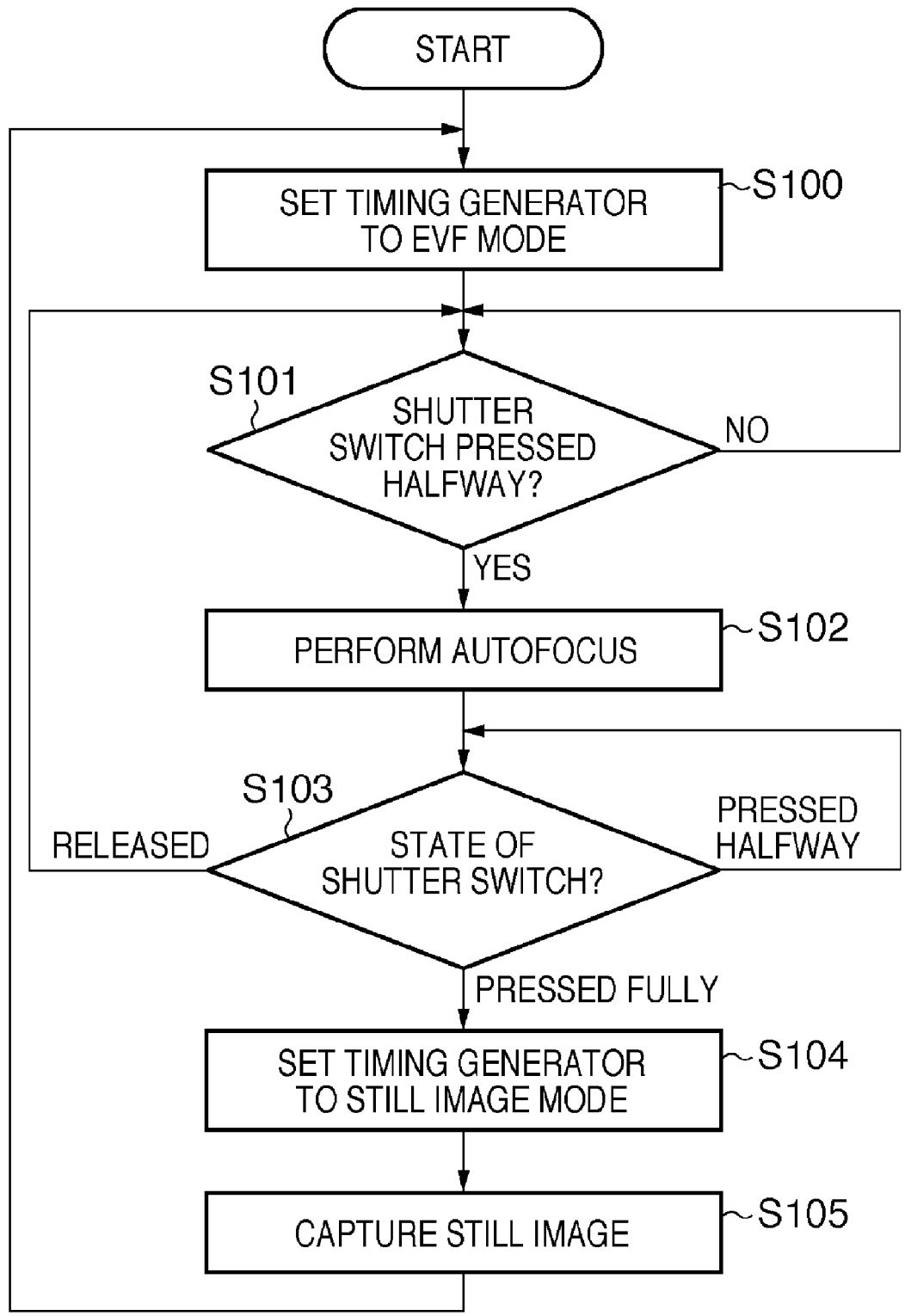
FIG. 4 is a flowchart illustrating the sequence of a readout mode switching process in still image sensing according to the first preferred embodiment of the present invention.

A method of switching the readout mode of the image sensor 101 in still image sensing will be explained next with reference to FIG. 4, as described above.

Assume that a first readout mode of reading out all the lines is a still image mode. Assume also that in a mode of thinning out and reading out the lines from the image sensor, a second readout mode of reading out lines having a large number of focus detecting pixels is an EVF mode, as shown in FIG. 2. Assume also that a third readout mode of reading out lines having a small number of focus detecting pixels is a moving image mode.

When the power supply of the image sensing apparatus according to this embodiment is ON, the process sequence starts and the image sensing mode is set to the still image sensing mode by the operation unit 112. The CPU 108 performs the following process unless otherwise specified.

In step S100, the timing generator 110 is set to the EVF mode. With this operation, lines having a large number of focus detecting pixels are read out from the image sensor 101.

In step S101, it is checked whether the shutter switch of the operation unit 112 is pressed halfway. If the shutter switch is not pressed halfway ("NO" in step S101), step S101 is repeated. If the shutter switch is pressed halfway ("YES" in step S101), the process advances to step S102.

In step S102, phase difference detection is performed using AF data extracted from the image data read out from the image sensor 101. Then, the lens position is moved by moving the lens barrel by the lens barrel control unit 111 so as to reduce the phase difference, thereby adjusting the focus.

In step S103, the state of the shutter switch is checked. If the shutter switch is kept pressed halfway, step S103 is repeated. If the shutter switch is released, the process returns to step S101. If the shutter switch is pressed fully, the process advances to step S104.

In step S104, the timing generator 110 is set to the still image mode. In the still image mode, a sensed image is read out from all the lines of the image sensor 101.

In step S105, the readout sensed image (still image) is captured and recorded on the recording medium 116.

After that, the process sequence from step S100 is repeated until the power supply is turned off by the operation unit 112.

The above-described process sequence can increase the AF accuracy for high resolution in the still image sensing according to this embodiment. Hence, autofocus and EVF display are performed by reading out lines having a large number of focus detecting pixels from the image sensor 101 during EVF display. In recording a still image, all the lines of the image sensor 101 are read out. This makes it possible to record a high-resolution image.

Figure 5:
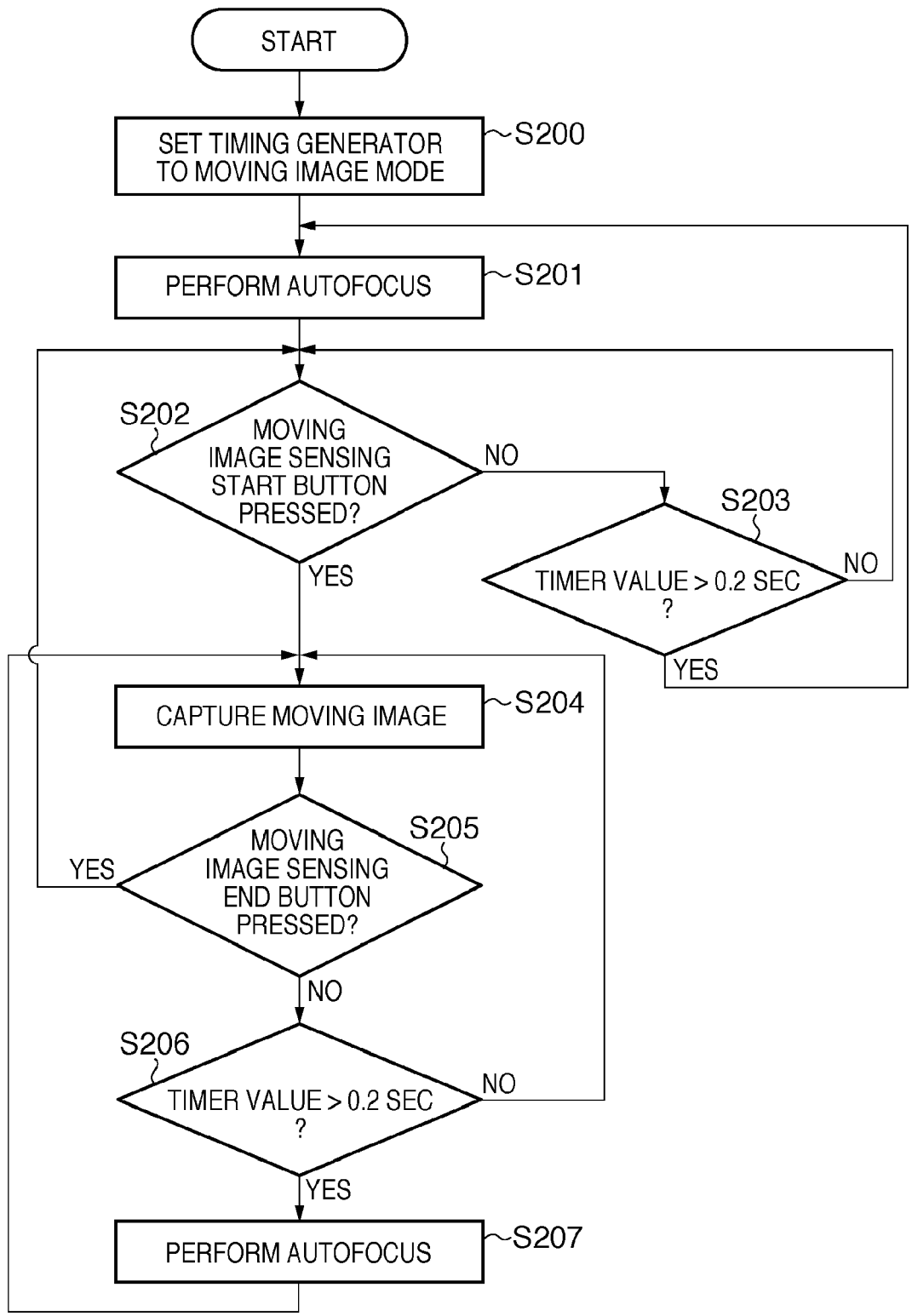
FIG. 5 is a flowchart illustrating the sequence of a readout mode switching process in moving image sensing according to the first preferred embodiment of the present invention.

A method of switching the readout mode of the image sensor 101 in moving image sensing will be explained next with reference to FIG. 5.

When the power supply of the image sensing apparatus according to this embodiment is ON, the process sequence starts and the image sensing mode is set to the still image sensing mode by the operation unit 112. The CPU 108 performs the following process unless otherwise specified.

In step S200, the timing generator 110 is set to the moving image mode. With this operation, lines having a small number of focus detecting pixels are read out from the image sensor 101.

In step S201, autofocus is performed. In the autofocus, phase difference detection is performed using AF data extracted from the image data read out from the image sensor 101, as in the still image sensing. Then, the lens position is moved by moving the lens barrel by the lens barrel control unit 111 so as to reduce the phase difference, thereby adjusting the focus.

In step S202, it is checked whether the moving image sensing start button is pressed in the operation unit 112. If the moving image sensing start button is not pressed ("NO" in step S202), the process advances to step S203. If the moving image sensing start button is pressed ("YES" in step S202), the process advances to step S204.

In step S203, the timer value is compared with a preset value to check the time which has elapsed from the previous autofocus. Although FIG. 5 exemplifies a case in which the timer value is compared with 0.2 sec, the present invention is not particularly limited to this. If 0.2 sec or more has elapsed already ("YES" in step S203), the process returns to step S201 and autofocus is performed again. If 0.2 sec or more has not elapsed yet ("NO" in step S203), step S202 is repeated.

In step S204, a moving image is captured and the image data is recorded on the recording medium 116.

In step S205, it is checked whether the moving image sensing end button is pressed in the operation unit 112. If the moving image sensing end button is pressed ("YES" in step S205), the process returns to step S202. If the moving image sensing end button is not pressed ("NO" in step S205), the process advances to step S206.

In step S206, it is checked whether a preset time (e.g., 0.2 sec in FIG. 5) or more has elapsed from the previous autofocus until the process shifts to step S206. If 0.2 sec or more has elapsed already ("YES" in step S206), the process advances to step S207 and autofocus is performed again. After that, the process returns to step S204, and a moving image is captured and the image data is recorded on the recording medium 116.

If 0.2 sec or more has not elapsed yet ("NO" in step S206), autofocus is not performed. The process returns to step S204, and a moving image is captured and the image data is recorded on the recording medium 116. After that, the process sequence from step S200 is repeated until the power supply is turned off by the operation unit 112.

In the moving image sensing according to this embodiment, lines having a small number of focus detecting pixels are read out from the image sensor 101 by the above-described process sequence in order to record a moving image with a quality better than that of the EVF image in the still image sensing. This makes it possible to record a moving image with a quality better than that of the EVF image.

(Second Embodiment)

In the first embodiment, all the lines of the image sensor 101 include focus detecting pixels, as shown in FIG. 2. In contrast, the second embodiment provides third lines (corresponding to the arrows of "Recording/display") including no focus detecting pixels in an image sensor 101. The switching of the readout mode of an image sensor according to this embodiment will be explained below. A block diagram of an image sensing apparatus according to this embodiment is the same as in FIG. 1.

Figure 6:
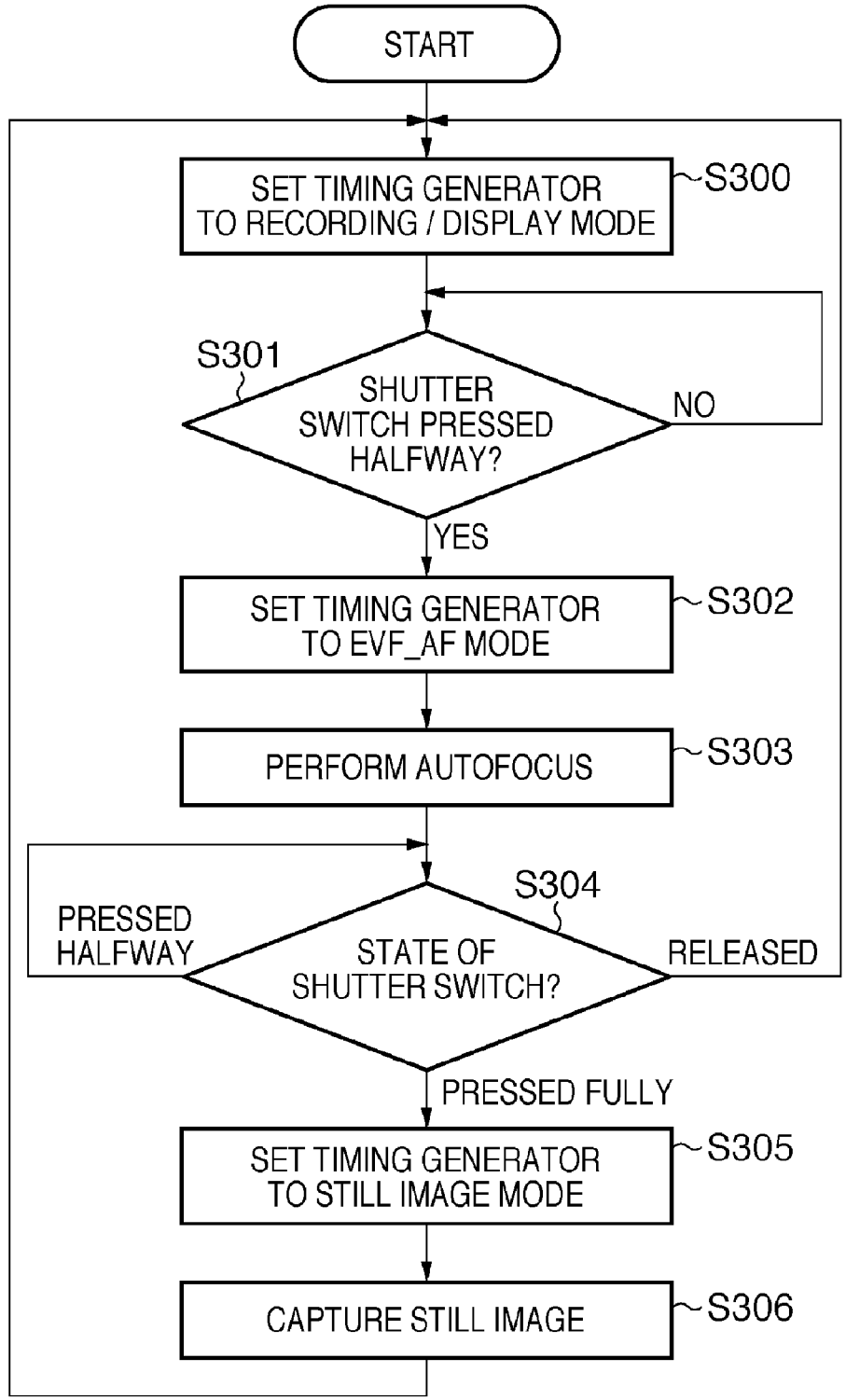
FIG. 6 is a flowchart illustrating the sequence of a readout mode switching process in still image sensing according to the second preferred embodiment of the present invention.

The switching of the readout mode of the image sensor 101 in still image sensing will be explained herein with reference to FIG. 6.

Figure 3:
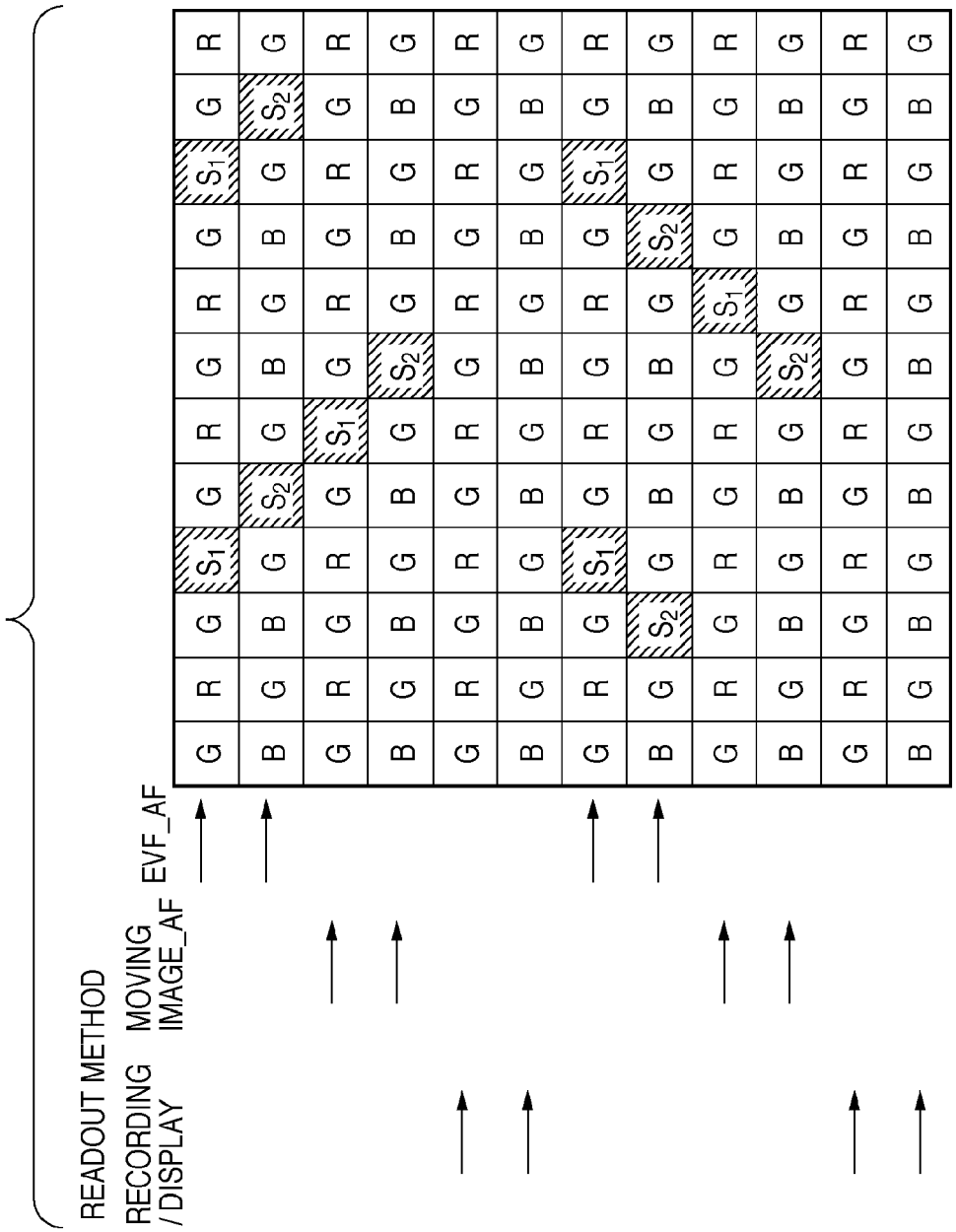
FIG. 3 is a schematic view showing an image sensor according to the second preferred embodiment of the present invention.

Assume that a first readout mode of reading out all the lines without thinning is a still image mode. Assume also that in a mode of thinning out and reading out the lines from the image sensor 101 as shown in FIG. 3, a second readout mode of reading out lines having a large number of focus detecting pixels for phase difference AF (two focus detecting pixels per line in FIG. 3) is an EVF_AF mode. Assume also that a third readout mode of reading out lines having a small number of focus detecting pixels (one focus detecting pixel per line in FIG. 3) is a moving image AF_mode. Assume also that a fourth readout mode of reading out lines including no focus detecting pixels is a recording/display mode.

When the power supply of the image sensing apparatus according to this embodiment is ON, the process sequence starts and the image sensing mode is set to the still image sensing mode by an operation unit 112.

In step S300, a timing generator 110 is set to the recording/display mode. With this operation, lines including no focus detecting pixels are read out from the image sensor 101.

In step S301, it is checked whether the shutter switch of the operation unit 112 is pressed halfway. If the shutter switch is not pressed halfway ("NO" in step S301), step S301 is repeated. If the shutter switch is pressed halfway ("YES" in step S301), the process advances to step S302.

In step S302, the timing generator 110 is set to the EVF_AF mode. With this operation, lines having a large number of focus detecting pixels are read out from the image sensor 101.

In step S303, phase difference detection is performed using AF data extracted from the image data read out from the image sensor 101. Then, the lens position is moved by moving the lens barrel by a lens barrel control unit 111 so as to reduce the phase difference, thereby adjusting the focus.

In step S304, the state of the shutter switch is checked. If the shutter switch is kept pressed halfway, step S304 is repeated. If the shutter switch is released, the process returns to step S300. If the shutter switch is pressed fully, the process advances to step S305.

In step S305, the timing generator 110 is set to the still image mode. In the still image mode, image data is read out from all the lines of the image sensor 101.

In step S306, the readout image data is captured and recorded on a recording medium 116. After that, the process sequence from step S300 is repeated until the power supply is turned off by the operation unit 112.

In the still image sensing according to this embodiment, the following process is performed by the above-described process sequence in order to attain an EVF image with a good quality when AF is not performed. That is, if AF is not performed, lines including no focus detecting pixels for phase difference AF on the image sensor are read out, and EVF display is performed. If AF is performed, lines having a large number of focus detecting pixels are read out from the image sensor, and autofocus and EVF display are performed, in order to increase the AF accuracy for high resolution. In recording a still image, reading out all the lines of the image sensor makes it possible to record a high-resolution image.

Figure 7:
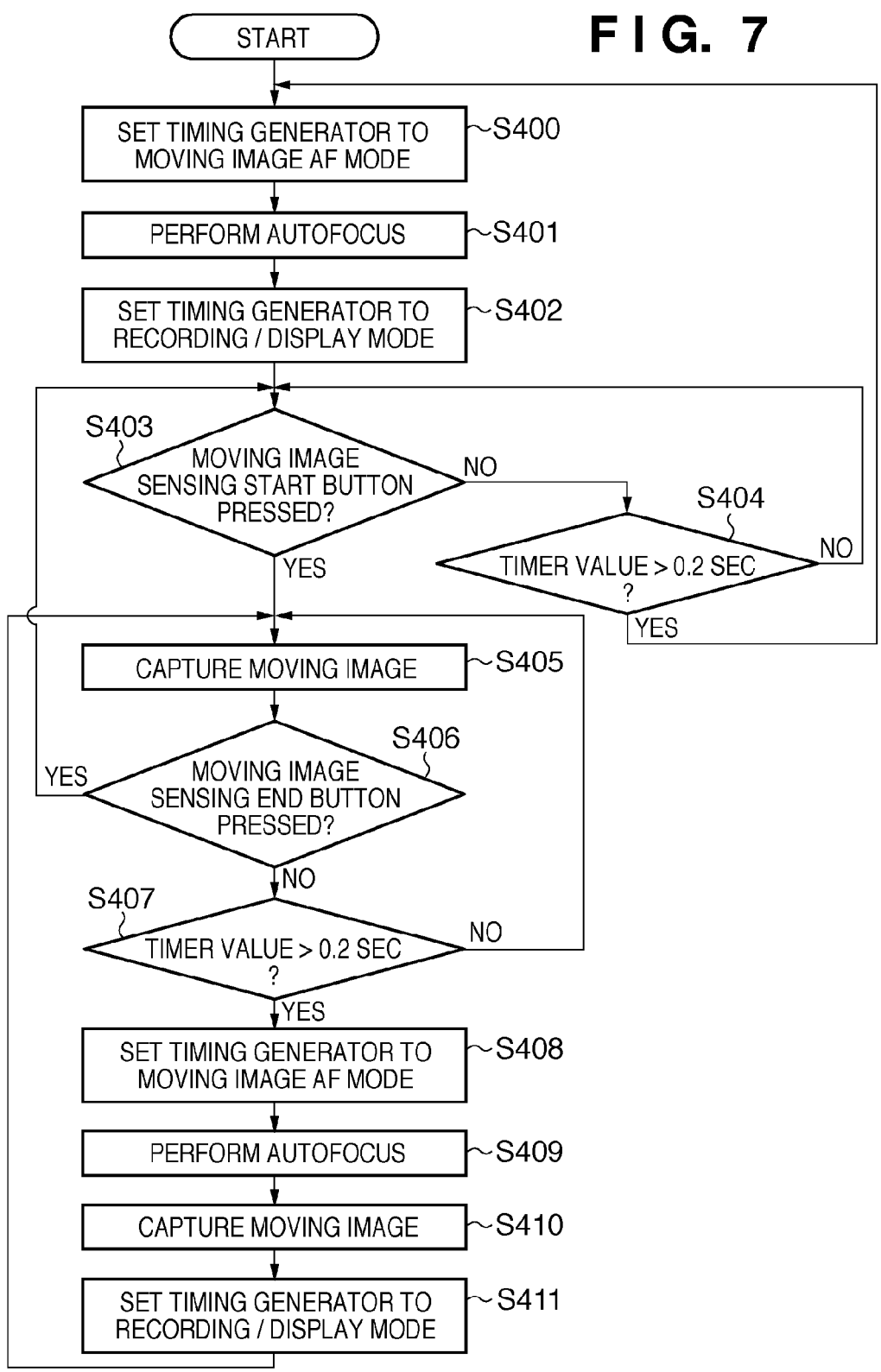
FIG. 7 is a flowchart illustrating the sequence of a readout mode switching process in moving image sensing according to the second preferred embodiment of the present invention.

A method of switching the readout mode of the image sensor 101 in moving image sensing will be explained next with reference to FIG. 7.

When the power supply of the image sensing apparatus according to this embodiment is ON, the process sequence starts and the image sensing mode is set to the still image sensing mode by the operation unit 112.

In step S400, the timing generator 110 is set to the moving image AF_mode. With this operation, lines having a small number of focus detecting pixels are read out from the image sensor 101.

In step S401, autofocus is performed. In the autofocus, phase difference detection is performed using AF data extracted from the image data read out from the image sensor 101, as in the still image sensing. Then, the lens position is moved by moving the lens barrel by a lens barrel control unit 111 so as to reduce the phase difference, thereby adjusting the focus.

In step S402, the timing generator 110 is set to the recording/display mode. With this operation, lines including no focus detecting pixels are read out from the image sensor 101.

In step S403, it is checked whether the moving image sensing start button is pressed in the operation unit 112. If the moving image sensing start button is not pressed ("NO" in step S403), the process advances to step S404.

In step S404, the timer value is compared with a preset value to check the time which has elapsed from the previous autofocus. Although FIG. 7 exemplifies a case in which the timer value is compared with 0.2 sec, the present invention is not particularly limited to this. If 0.2 sec or more has elapsed already ("YES" in step S404), the process returns to step S400. If 0.2 sec or more has not elapsed yet ("NO" in step S404), step S403 is repeated.

In step S405, a moving image is captured and the image data is recorded on the recording medium 116.

In step S406, it is checked whether the moving image sensing end button is pressed in the operation unit 112. If the moving image sensing end button is pressed ("YES" in step S406), the process returns to step S403. If the moving image sensing end button is not pressed ("NO" in step S406), the process advances to step S407.

In step S407, it is checked whether a preset time (e.g., 0.2 sec in FIG. 7) or more has elapsed from the previous autofocus until the process shifts to step S407. If 0.2 sec or more has not elapsed yet ("NO" in step S407), the process returns to step S405, and a moving image is captured and the image data is recorded on the recording medium 116. If 0.2 sec or more has elapsed already ("YES" in step S407), the process advances to step S408.

In step S408, the timing generator 110 is set to the moving image_AF mode. With this operation, lines having a small number of focus detecting pixels are read out from the image sensor 101.

In step S409, autofocus is performed.

In step S410, a moving image is captured and the image data is recorded on the recording medium 116. The image recorded at this time is the one generated from the image data read out by setting the timing generator 110 to the moving image_AF mode.

In step S411, the timing generator 110 is set to the recording/display mode. The process then returns to step S405, and the process sequence is repeated. After that, the process sequence from step S400 is repeated until the power supply is turned off by the operation unit 112.

In the moving image sensing according to this embodiment, lines including no photoelectric conversion elements for phase difference AF are read out from the image sensor 101 by the above-described process sequence if autofocus is not performed. If autofocus is performed, lines having a small number of focus detecting pixels are read out from the image sensor 101 in order to record a moving image with a quality better than that of the EVF image in the still image sensing. This makes it possible to record a moving image with a quality better than that of the EVF image.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-276757, filed Oct. 24, 2007, which is hereby incorporated by reference herein in its entirety.

The invention claimed is:

1. An image sensing apparatus comprising:
an image sensor including a first pixel group which photoelectrically converts an object image formed by a light beam from an image sensing optical system, and a second pixel group including a plurality of pupil-divided pixels which photoelectrically convert pupil-divided light beam components of the light beam from the image sensing optical system into first and second pupil-divided images;
a phase difference detecting unit positioned in the image sensing apparatus to detect a phase difference between the first and second pupil-divided images on the basis of the output from the second pixel group; and
a controller positioned in the image sensing apparatus to control the image sensor to output a signal from a predetermined pixel of the image sensor,
wherein the image sensor includes a plurality of first lines in each of which N (N is an integer not less than 2) second pixels are arranged, and a plurality of second lines in each of which M (M is a natural number less than N) second pixels are arranged, and
wherein the controller controls the image sensor in accordance with whether a sensed moving image is being recorded such that the signal is output from the plurality of first lines during moving image sensing wherein the sensed moving image is not being recorded, and the signal is output from the plurality of second lines during moving image sensing wherein the sensed moving image is being recorded.

2. The apparatus according to claim 1, wherein the controller includes:
a first readout mode for reading out the first lines and the second lines,
a second readout mode for reading out the first lines, and
a third readout mode for reading out the second lines.

3. The apparatus according to claim 2, further comprising:
a display positioned in the image sensing apparatus to display an image sensed by the image sensor; and
a readout mode switching unit that records a sensed image in the first readout mode, and displays a still image on the display in the second readout mode.

4. The apparatus according to claim 3, wherein the readout mode switching unit records a moving image in a memory in the third readout mode.

* * * * *